(12) United States Patent
Jiang et al.

(10) Patent No.: US 8,051,552 B2
(45) Date of Patent: Nov. 8, 2011

(54) STITCHED WRAP AROUND SHIELD FABRICATION FOR PERPENDICULAR MAGNETIC RECORDING WRITE HEADS

(75) Inventors: Ming Jiang, San Jose, CA (US); Yi Zheng, San Ramon, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 1155 days.

(21) Appl. No.: 11/747,704

(22) Filed: May 11, 2007

(65) Prior Publication Data
US 2008/0278861 A1 Nov. 13, 2008

(51) Int. Cl.
*G11B 5/127* (2006.01)
*H04R 31/00* (2006.01)

(52) U.S. Cl. ............... 29/603.16; 29/603.07; 29/603.13; 29/603.15; 29/603.18; 205/119; 205/122; 216/22; 216/65; 216/66; 360/121; 360/122; 360/317; 451/5; 451/41

(58) Field of Classification Search .............. 29/603.07, 29/603.13–603.16, 603.18; 205/119, 122; 216/22, 65, 66; 360/121, 122, 317, 319; 451/5, 41
See application file for complete search history.

(56) References Cited

U.S. PATENT DOCUMENTS

| | | | |
|---|---|---|---|
| 4,656,546 A | 4/1987 | Mallory | |
| 7,649,712 B2 * | 1/2010 | Le et al. | ............... 360/125.3 |
| 2002/0176214 A1 | 11/2002 | Shukh et al. | |
| 2005/0057852 A1 | 3/2005 | Yazawa et al. | |
| 2005/0068669 A1 | 3/2005 | Hsu et al. | |

* cited by examiner

*Primary Examiner* — Paul D Kim
(74) *Attorney, Agent, or Firm* — Duft Bornsen & Fishman, LLP (57) ABSTRACT

A wrap around shield of a write head is fabricated in multiple processes, with side shields fabricated in one process, and a trailing shield formed in another process. These multiple processes form a stitched wrap around shield, resulting in more flexible and accurate placement of the trailing shield and side shields with respect to the write pole. These processes also independently form the dimensions (shapes and sizes) of the side shields and the trailing shield which allows better control of writeability, saturation, and adjacent track interference of the perpendicular recording write head.

6 Claims, 12 Drawing Sheets

STITCHED WRAP AROUND SHIELD FABRICATION FOR PERPENDICULAR MAGNETIC RECORDING WRITE HEADS

BACKGROUND OF THE INVENTION

1. Field of the Invention

The invention is related to the field of perpendicular magnetic recording (PMR) on magnetic recording hard disk drive systems and, in particular, to fabricating a stitched wrap around shield for a PMR write head.

2. Statement of the Problem

Magnetic hard disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

In a disk drive utilizing perpendicular recording, data is recorded on a magnetic recording disk by magnetizing the recording medium in a direction perpendicular to the surface of the disk. In this type of recording, the magnetic easy axes of the magnetic grains which store the recorded data are arranged perpendicular to the disk surface, instead of parallel to the disk surface as is the case in longitudinal recording. Perpendicularly recorded data is more stable than longitudinal data, and the data can be recorded at a higher density than longitudinal data. The coercivity of the medium is higher, since the magnetic recording layer is in effect "inside the gap" between the head and a soft underlayer (SUL) that is located under the magnetic layer. In addition, for the same read head design, perpendicular data provides greater read back amplitude. The disk has a higher magnetic moment-thickness product (MrT). For the same physical width of the read head, the magnetic read width is narrower.

High track density heads use narrow write pole widths. A sufficiently short flare length (i.e., the distance between the ABS and the point where the write pole flares out) is used to maintain the write field strength of a narrow track width perpendicular write head. As a result, the widened portion of a write pole behind the flare point is close to the recording medium and can produce undesired fields to the extent that the data in adjacent tracks may be erased. A balance between writeability and adjacent track interference (ATI) is needed for high track density perpendicular write heads.

Figure 1:
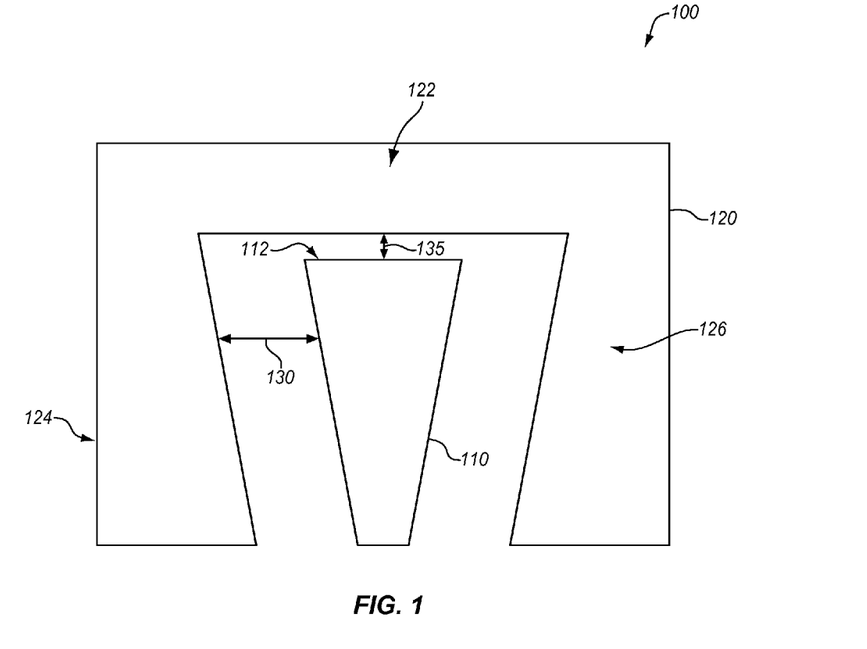
FIG. 1 illustrates an ABS view of a write head with a wrap around shield.

Wrap around shield designs are utilized for high track density recording to shield adjacent tracks from unintended recording. FIG. 1 illustrates an ABS view of a typical write head 100 with a wrap around shield 120. As shown in FIG. 1, wrap around shield 120 has a trailing shield 122 placed in the proximity of the trailing surface 112 of the write pole 110, separated from write pole 110 by a gap 135. The function of trailing shield 122 is to improve the write field gradient and transition curvature of write pole 110. Wrap around shield 120 also has side shields 124 and 126 disposed on sides of write pole 110. Side shields 124 and 126 are separated from write pole 110 by a gap 130. Utilizing wrap around shield 120, the fringe fields are mostly confined between write pole 110 and side shields 124 and 126 and therefore the fringe fields create much less interference with adjacent tracks. Gap 135 is smaller than gap 130, and the thickness for both is important for proper write performance, and thus, there is a need for accurately controlling the thickness of trailing gap 135 and side gap 130 during manufacturing.

In prior art processes, trailing shield 122 and side shields 124 and 126 are fabricated at the same time. As a result, the manufacturing process focuses more on the alignment of trailing shield 122 with write pole 110 than the alignment of side shields 124 and 126 with write pole 110. This is because the tolerance of aligning trailing shield 122 with write pole 110 is less than the tolerance of aligning side shields 124 and 126 with write pole 110. Further, prior art processes lack flexibility and require very aggressive design points, such as flare point and shield throat height, which are challenging for processing control during manufacture. Further, fabrication is more difficult because of the topography caused by present fabrication methods.

SUMMARY OF THE SOLUTION

Embodiments of the invention solve the above and other related problems with improved methods for fabricating write heads. More specifically, a wrap around shield of a write head is fabricated in multiple processes, with side shields fabricated in one process, and a trailing shield formed in another process. These multiple processes form a stitched wrap around shield, with the side shields and trailing shield magnetically coupled. Advantageously, the gap between the side shields and the write pole may be accurately defined in one process, and the gap between the trailing shield and the write pole may be accurately defined in a separate process. As a result, the wrap around shield is more accurately aligned with the write pole.

Further, the shapes and sizes of the trailing shield and side shields can be independently made and controlled to balance writeability, saturation, and adjacent track interference (ATI) of the write head. The trailing shield and the corresponding gap may be accurately defined on a more relatively flat surface. The placement of the side shields is easier and more accurately controlled compared to prior art wrap around shield fabrication processes, which focus more on the placement of the trailing shield.

Further, a notch may be formed in the trailing shield gap and the trailing shield. A perpendicular head with a notched wrap around shield structure has less transition curvature and better writeability. The reduced transition curvature is due to the modification of the main pole field contour by the notched top write gap. The better writeability of the recording head is a result of less flux shunting to the shield.

An embodiment of the invention is a method for forming a stitched wrap around shield of a write head. The method comprises forming a write pole of the write head. The method further comprises forming side shield gap structures on side regions of the write pole. The side shield gap structures may be formed by depositing a first layer of non-magnetic material. The method further comprises forming side shields on side regions of the write pole above the side shield gap structures. The side shield gap structures define a first gap separating the write pole and the side shields. The method further comprises removing portions of the first layer of non-magnetic material above the write pole. The method further comprises forming a trailing shield gap structure above the write pole, and forming a trailing shield of the write head. The trailing shield gap structure defines a second gap separating the write pole and the trailing shield, and the second gap is less than the first gap. Advantageously, the method allows the side shields and trailing shield to be formed separately, resulting in more accurate alignment of the shields with respect to the write pole, and independent sizes and shapes of the side shields and trailing shield.

The invention may include other exemplary embodiments described below.

DESCRIPTION OF THE DRAWINGS

The same reference number represents the same element or same type of element on all drawings.

DETAILED DESCRIPTION OF THE INVENTION

Figure 2:
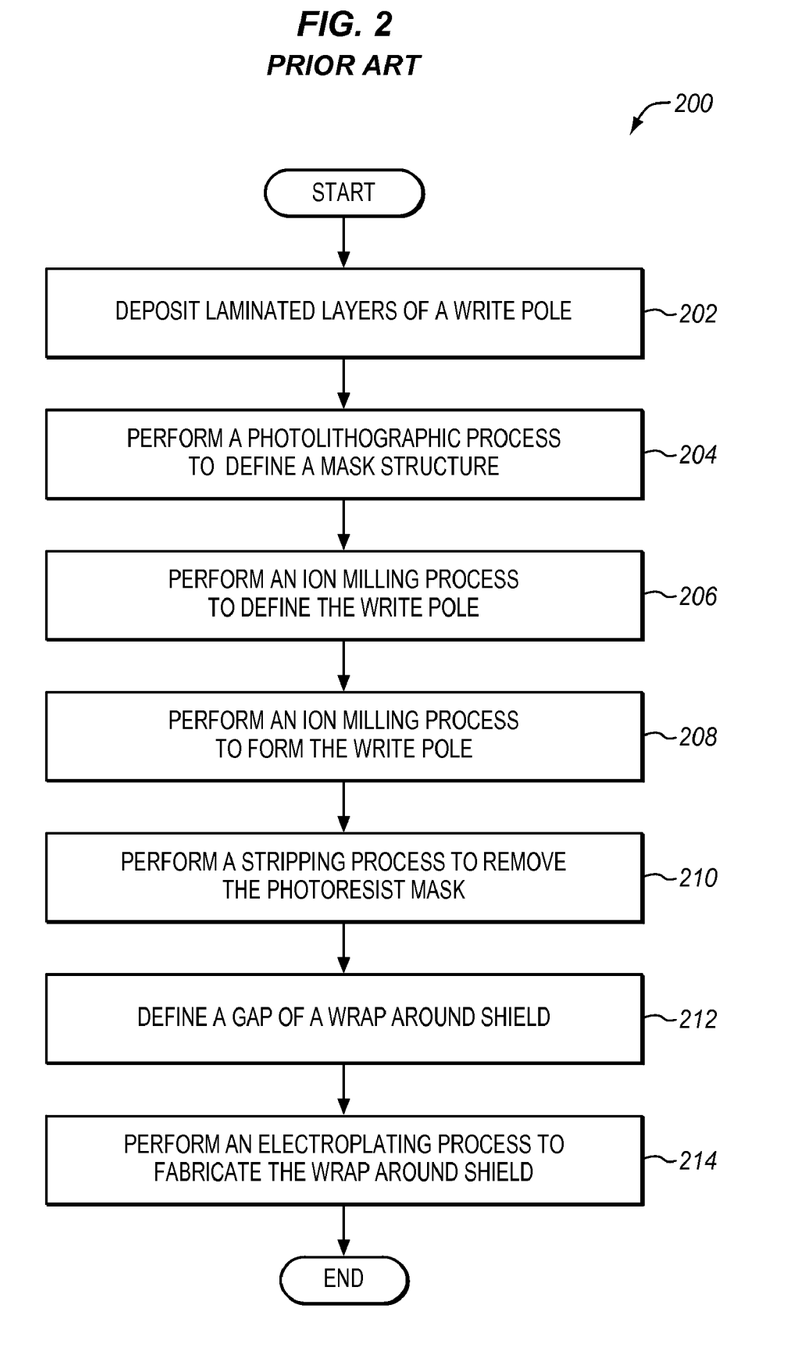
FIG. 2 illustrates a flow chart of a prior art method for fabricating the write head of FIG. 1.

FIG. 2 illustrates a flow chart of a prior art method 200 for fabricating the write head 100 of FIG. 1. FIGS. 3-11 illustrate cross sectional views of a prior art write head 100 during fabrication according to method 200 of FIG. 2. The steps of method 200 will be described in reference to write head 100 illustrated in FIGS. 3-11.

Figure 3:
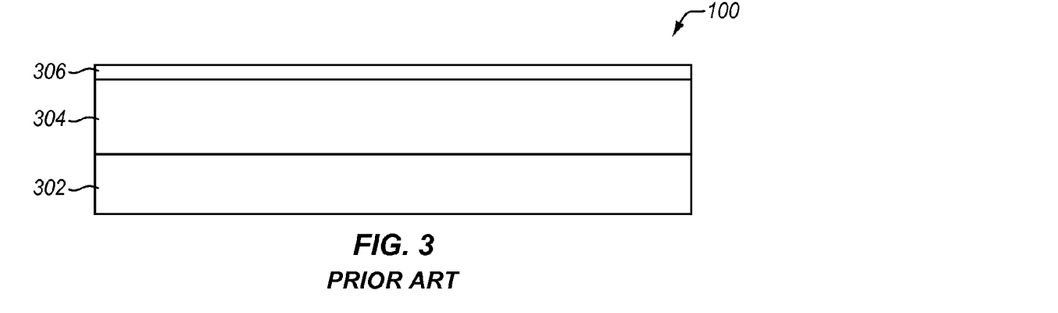
FIGS. 3-11 illustrate cross sectional views of a prior art write head of FIG. 1 during fabrication according to the method of FIG. 2.
Figure 4:
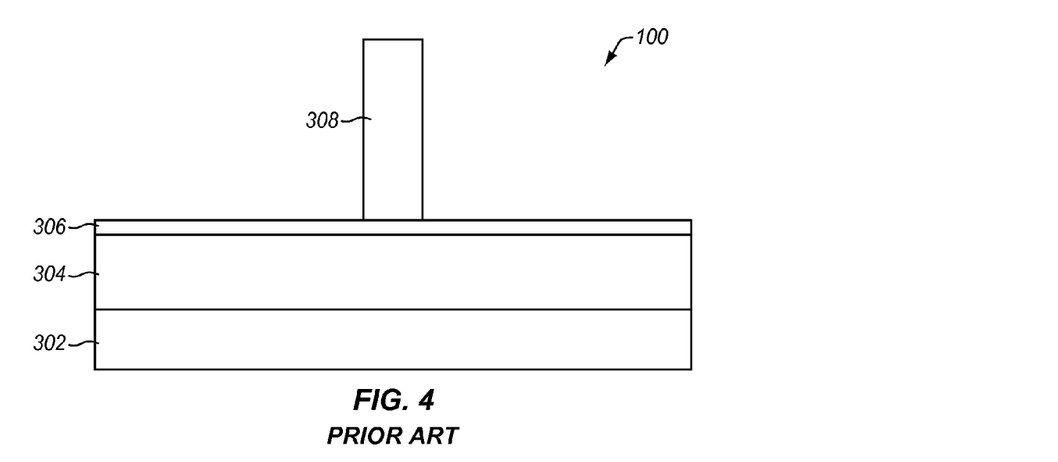
Figure 5:
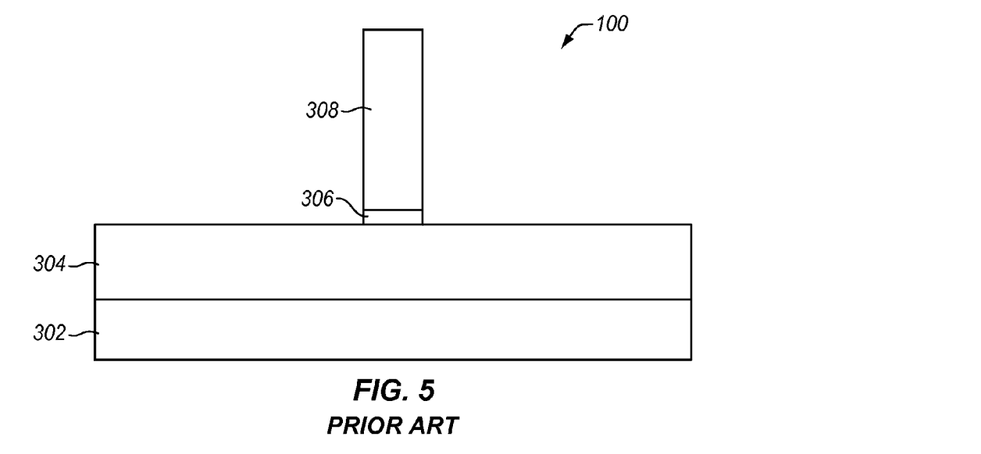
Figure 6:
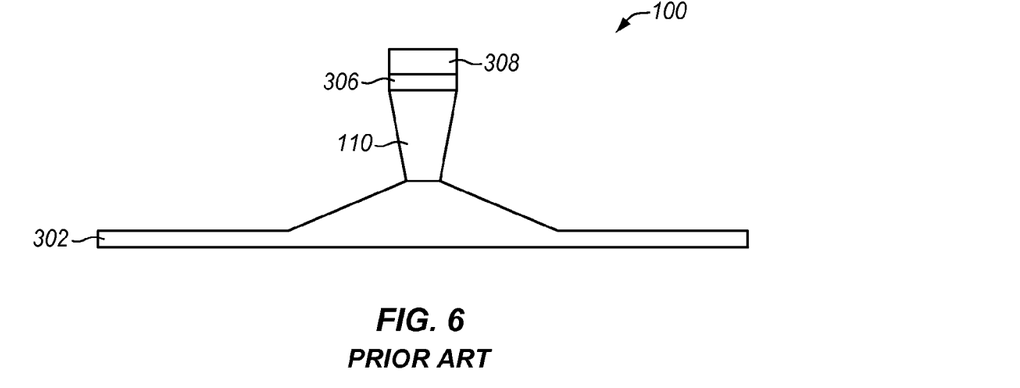
Figure 7:
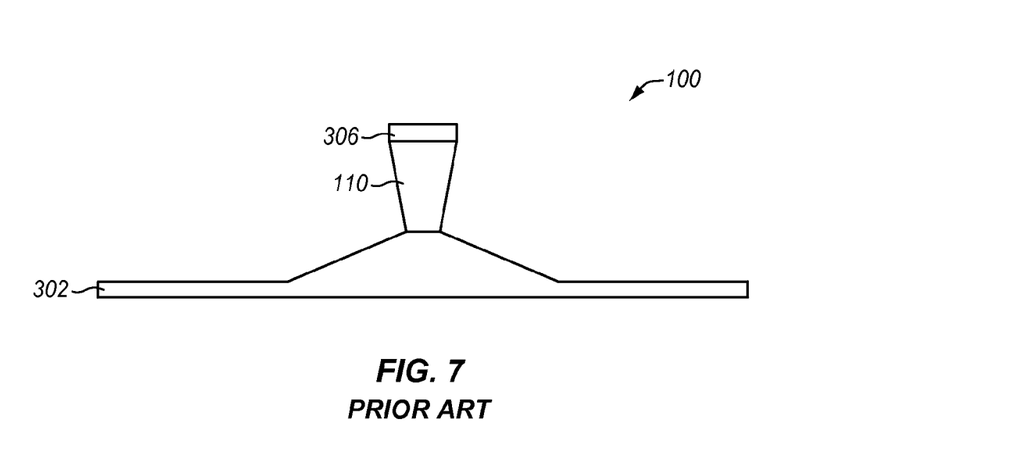
Figure 8:
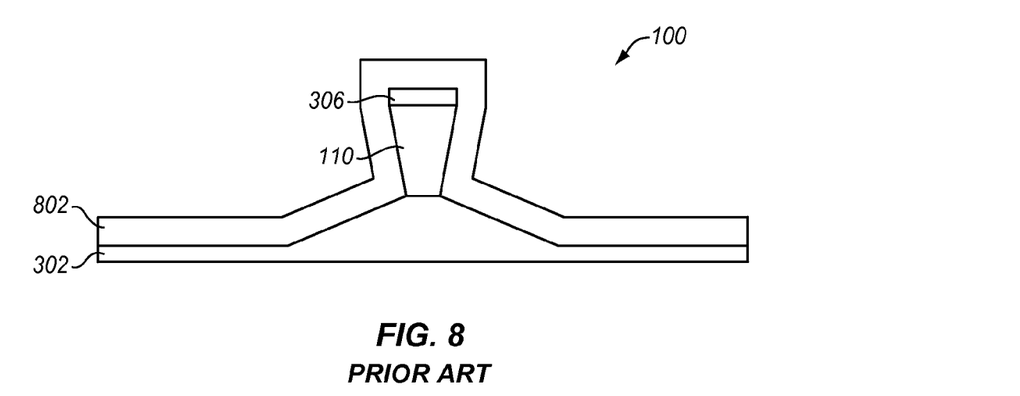
Figure 9:
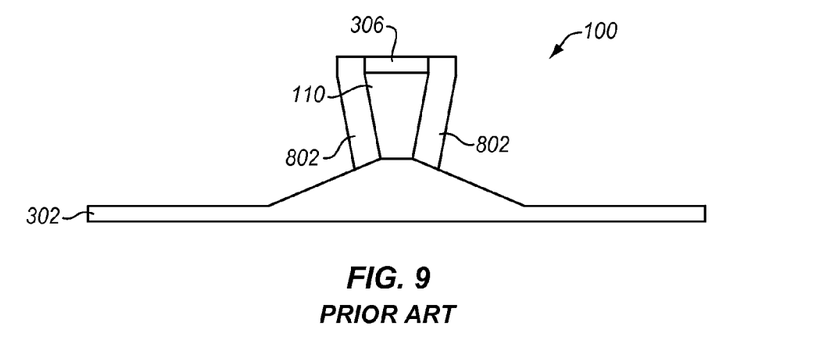
Figure 10:
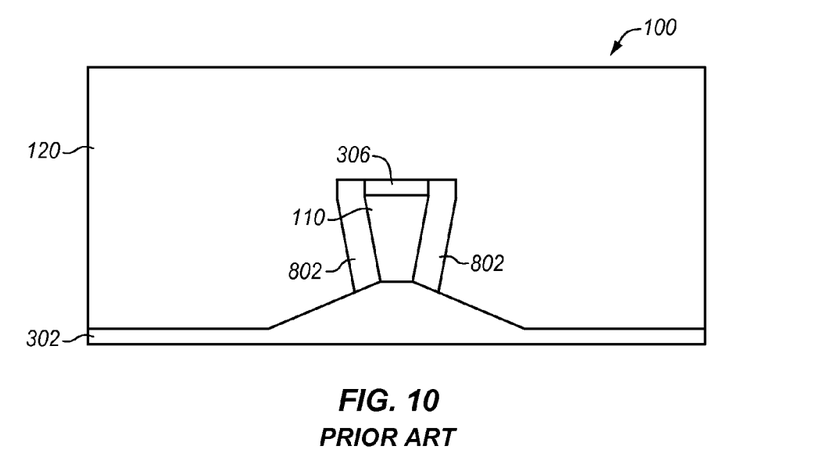

In step 202, laminated layers 304 of a write pole (e.g., write pole 110 of FIG. 1) are deposited on an insulator layer 302 (see FIG. 3). A hard masking layer 306 (such as Alumina) is deposited above laminated layers 304. In step 204, a photoresist mask structure 308 is formed (see FIG. 4) using a photolithographic process. In step 206, a reactive ion etching (RIE), ion milling, or reactive ion milling process is then performed to remove exposed portions of masking layer 306 not protected by photo resistive layer 308 to form hard mask structure 306 (see FIG. 5). In step 208, an ion milling process is performed to define write pole 110 (see FIG. 6). In step 210, a stripping process removes photoresist layer 308 (see FIG. 7).

In step 212, a gap thickness of a wrap around shield 120 (see FIG. 1) is defined around write pole 110. First, a layer of non-magnetic material 802 (such as atomic layer deposition (ALD) Alumina) is deposited (see FIG. 8). Ion milling removes non-magnetic material 802 above hard mask 306 (see FIG. 9). Gaps are defined around write pole 110, with the side shield gap 130 (see FIG. 1) being the thickness of the layers of ALD Alumina 802, and the trailing shield gap 135 (see FIG. 1) being the thickness of the layer of Alumina mask 306. In step 214, an electroplating process is performed to fabricate wrap around shield 120 (see FIG. 10). CMP is performed to planarize a top surface of write head 100.

Figure 11:
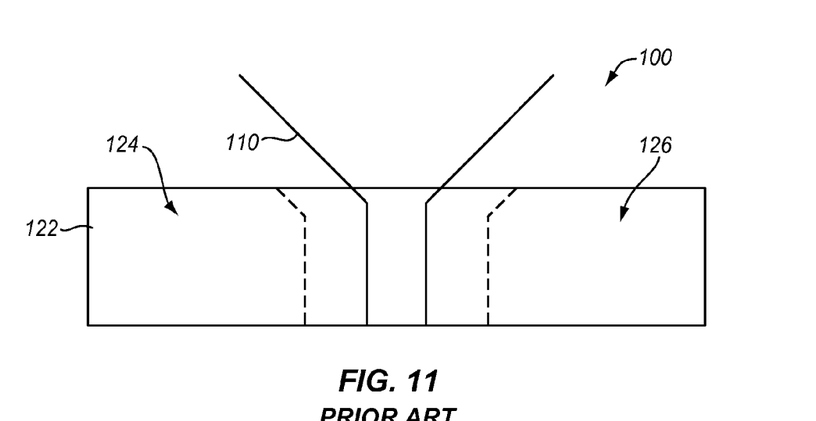

FIG. 11 illustrates a top view of write head 100 after completion of step 212. Trailing shield 122 is disposed on a trailing edge of write pole 110. Below trailing shield 122 are side shields 124 and 126 on each side of write pole 110. Side shields 124 and 126 drape from trailing shield 122, and the dimensions of side shields 124 and 126 are determined by the dimensions of trailing shield 122. Thus, write head 100 fabricated according to method 200 does not provide flexible control of independent sizes and shapes of trailing shield 122 and side shields 124 and 126. As previously discussed, method 200 may not be adequately flexible to form gaps and shields of write head 100 to achieve desired writing performances. The processing control is also challenging during manufacture. The subsequently described methods of fabricating a stitched wrap around shield solves the previously described problems and other problems encountered in fabrication of write head 100.

FIGS. 12-29 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 12:
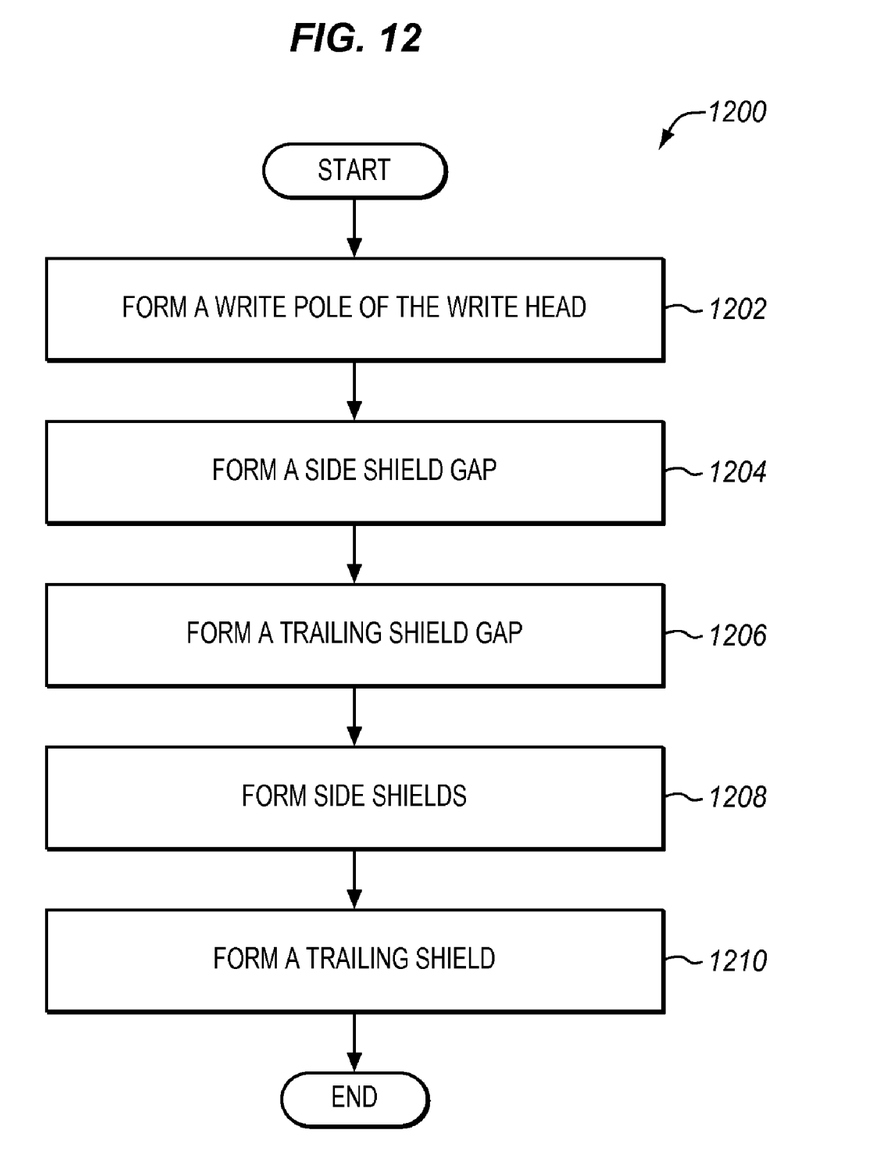
FIG. 12 illustrates a method for fabricating a write head with a stitched wrap around shield in an exemplary embodiment of the invention.
Figure 13:
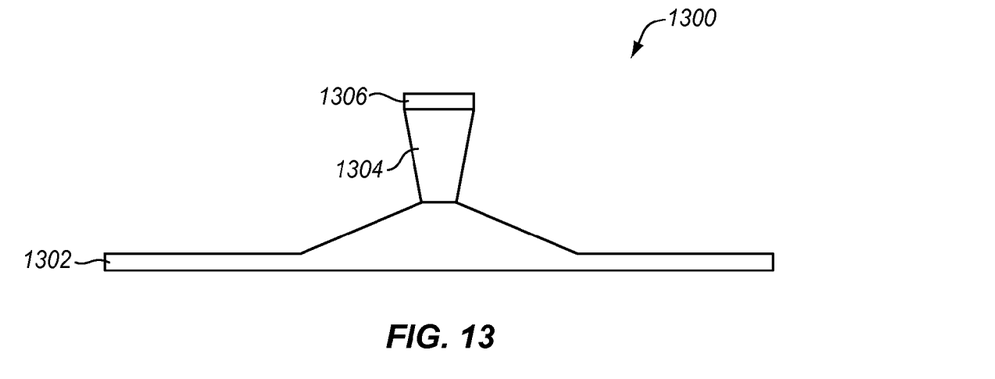
FIGS. 13-18 illustrate cross sectional views of a write head fabricated according to the method of FIG. 12 in an exemplary embodiment of the invention.

FIG. 12 illustrates a method 1200 for fabricating a write head with a stitched wrap around shield in an exemplary embodiment of the invention. FIGS. 13-18 illustrate cross sectional views of a write head 1300 fabricated according to method 1200 of FIG. 12 in an exemplary embodiment of the invention. The steps of method 1200 will be described in reference to write head 1300 illustrated in FIGS. 13-18. The steps of method 1200 may not be all-inclusive, and may include other steps not shown for the sake of brevity.

Figure 14:
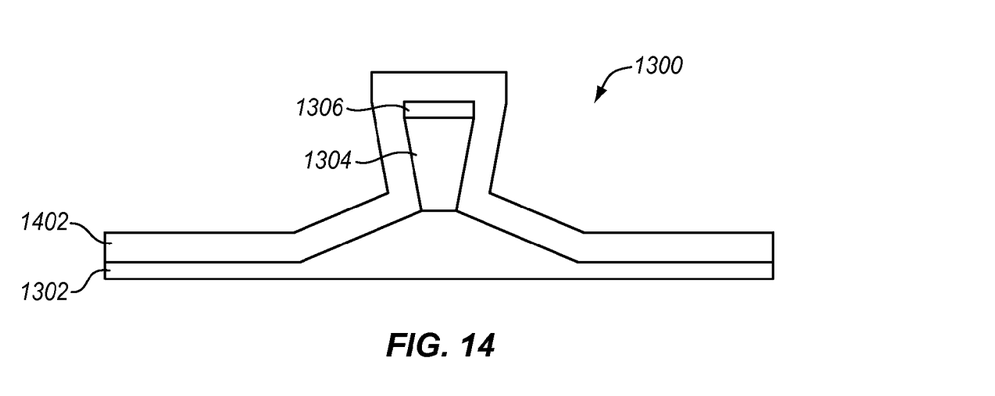

Step 1202 comprises forming a write pole 1304 (see FIG. 13) above insulator layer 1302 using hard mask 1306 (e.g., Alumina material) of write head 1300. Step 1204 comprises forming side shield gap structure 1402 (see FIG. 14) of write head 1300. Side shield gap structure 1402 may be formed by depositing one or more layers of non-magnetic material (such as ALD Alumina). The deposition thickness of the layers of non-magnetic material may correspond to the desired side shield gap thickness of write head 1300. The resulting structure of write head 1300 is illustrated in FIG. 14.

Figure 15:
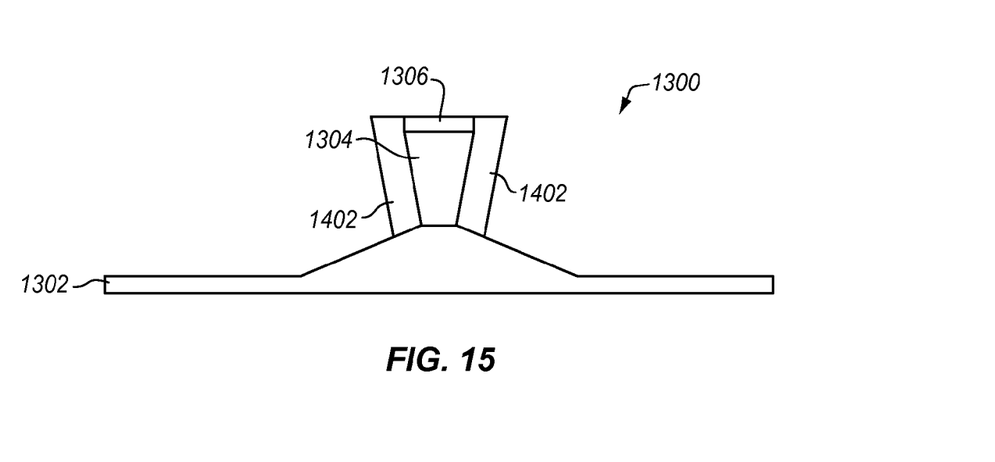

Step 1206 comprises ion milling to remove a top portion of the non-magnetic material (e.g. side shield gap structure 1402) to form a trailing shield gap 1306, and to remove a bottom portion of the non-magnetic material to allow subsequently formed side shields to cover write pole 1304 (see FIG. 15).

Figure 16:
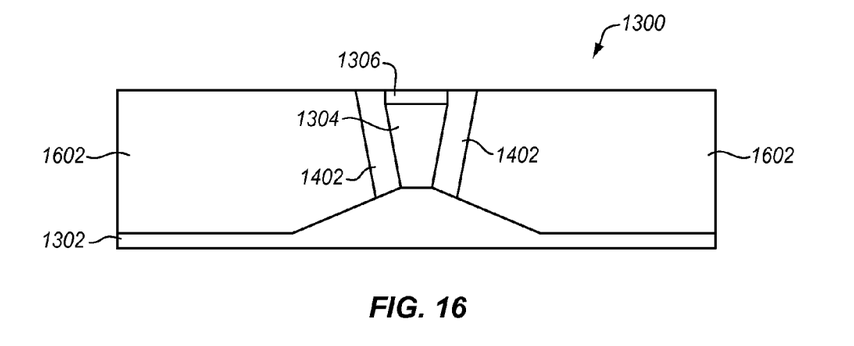

Step 1208 comprises forming side shields 1602 (see FIG. 16) of write head 1300. Side shields 1602 may be formed through an electroplating process, and a CMP process may be used to planarize side shields 1602 to mask structure 1306. The resulting structure of write head 1300 is illustrated in FIG. 16.

Figure 17:
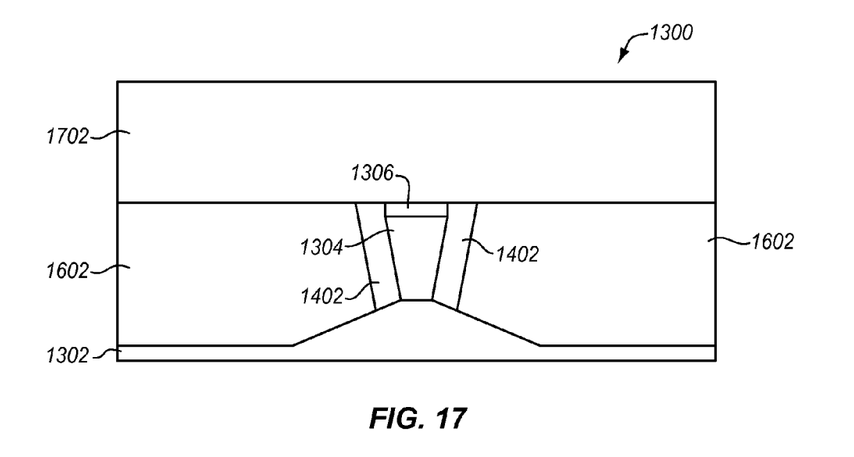

Step 1210 comprises forming a trailing shield 1702 (see FIG. 17). Trailing shield 1702 may be formed through an electroplating process. A CMP process may be used to planarize trailing shield 1702 to a desired height. The resulting structure of write head 1300 is illustrated in FIG. 17.

Figure 18:
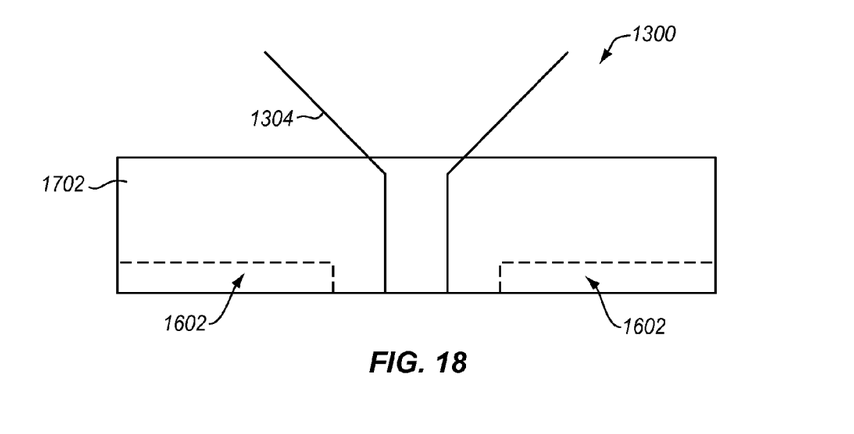

FIG. 18 illustrates a top view of write head 1300 after completion of step 1210. Trailing shield 1702 is disposed on a trailing edge of write pole 1304. Below trailing shield 1702 is a side shield 1602 on each side of write pole 1304. Side shields 1602 don't drape from trailing shield 1702 like the side shields of write head 100 in FIG. 11. Advantageously, write head 1300 of FIGS. 17-18 has a side shield gap defined by side shield gap structure 1402 and a trailing shield gap defined by mask structure 1306. These gaps are of different widths and more accurately aligned with write pole 1304. Also, the dimensions of side shields 1602 are determined independently of the dimensions of trailing shield 1702 and are more flexibly controlled, as are the dimensions of trailing shield 1702.

Figure 19:
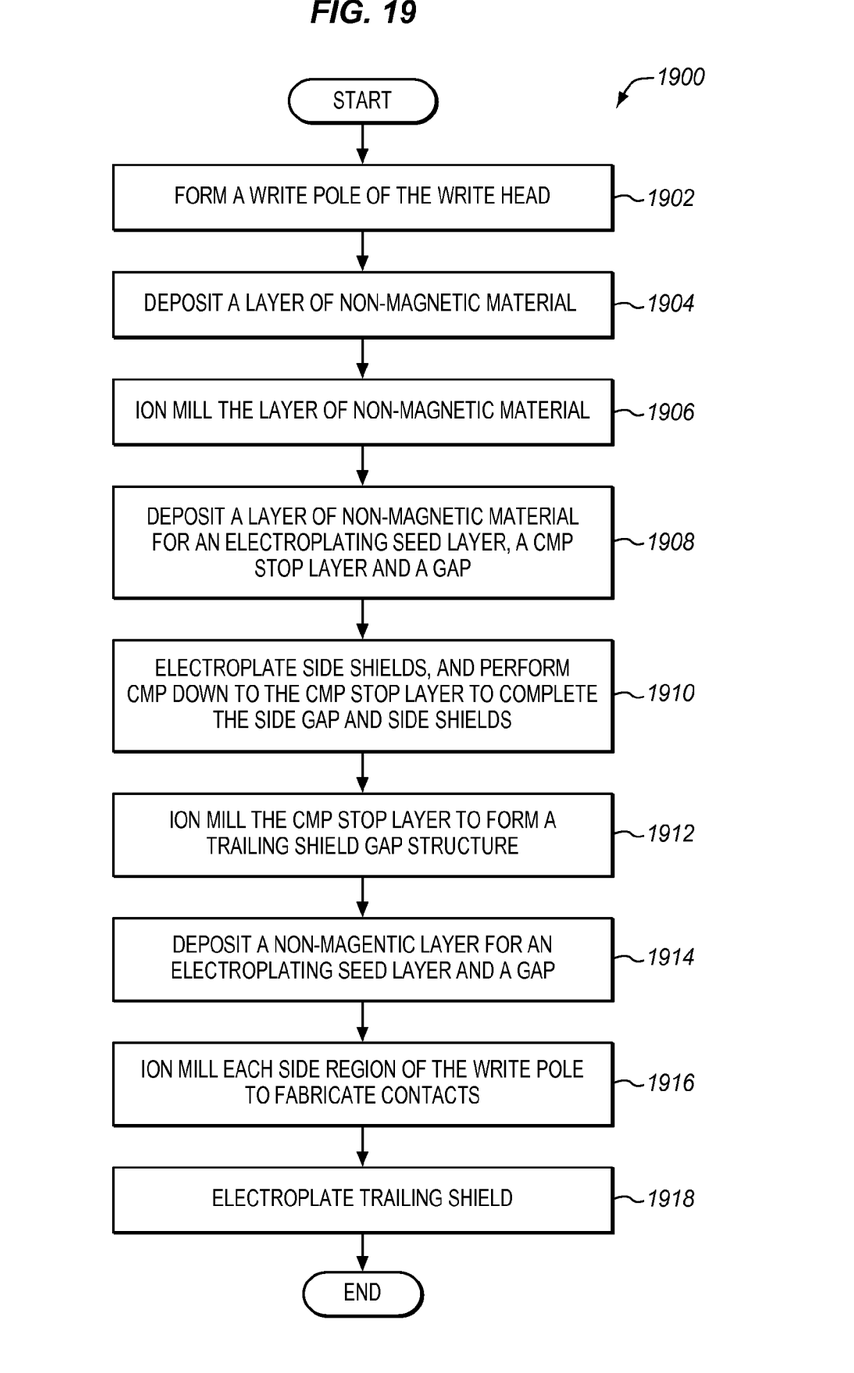
FIG. 19 illustrates a method for fabricating a write head with a stitched wrap around shield in another exemplary embodiment of the invention.
Figure 20:
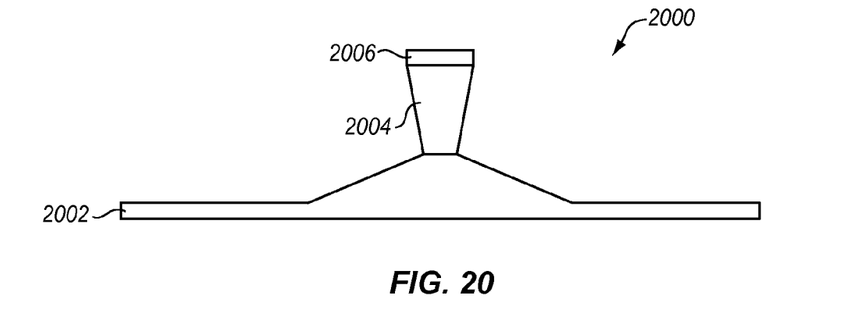
FIGS. 20-29 illustrate cross sectional views of a write head fabricated according to the method of FIG. 19 in an exemplary embodiment of the invention.
Figure 21:
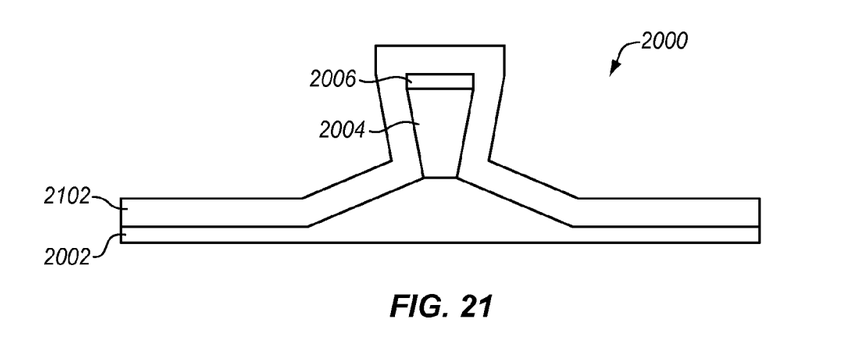

FIG. 19 illustrates a method 1900 for fabricating a write head with a stitched wrap around shield in another exemplary embodiment of the invention. FIGS. 20-29 illustrate cross sectional views of a write head 2000 fabricated according to method 1900 of FIG. 19 in an exemplary embodiment of the invention. The steps of method 1900 will be described in reference to write head 2000 illustrated in FIGS. 20-29. The steps of method 1900 may not be all-inclusive, and may include other steps not shown for the sake of brevity.

Step 1902 comprises forming a write pole 2004 (see FIG. 20) of write head 2000. Write pole 2004 may be formed over an insulator layer 2002 in a similar manner as described in steps 202 to 208 of method 200 of FIG. 2. The laminated layers may be AFC CoFe/Cr/CoFe/CrNi. The stripping process may be performed in multiple steps, such as a Tetramethyl ammonium hydroxide (TMAH) etching process, an N-methyl pyrrolidinone (NMP) stripping process, and an $O_2$ RIE process to remove the photoresist mask. As such, a hard mask Alumina structure 2006 may be present above write pole 2004 after the write pole definition process is completed. The resulting structure of write head 2000 is illustrated FIG. 20.

Step 1904 comprises depositing one or more layers of non-magnetic material to define a side gap of write pole 2004. First, a layer of non-magnetic material 2102 (see FIG. 21) may be deposited, such as ALD Alumina.

Figure 22:
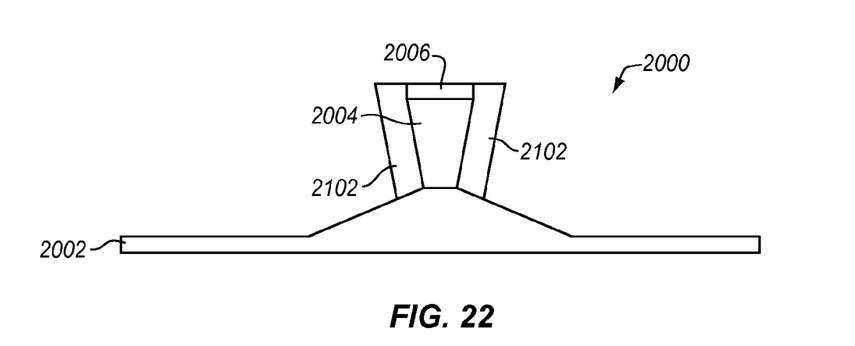

In step 1906, an Ar ion milling process is performed to remove non-magnetic material 2102 above hard mask layer 2006 on top of write pole 2004. The ion milling process may be performed at an angle between 45-60 degrees using SIMS end point detection, such as an angle of 55 degrees. The ion milling process end point may be controlled by detecting Ta, Ti, and Si if hard mask structure 2006 comprises a $TaO_2$ layer, a $TiO_2$ layer, or a $SiO_2$ layer above a hard mask Alumina layer. The ion mill process also removes the bottom regions of non-magnetic material 2102 on each side of write pole 2004 to allow subsequently formed side shields to cover write pole 2004. The resulting structure of write head 2000 is illustrated in FIG. 22.

Figure 23:
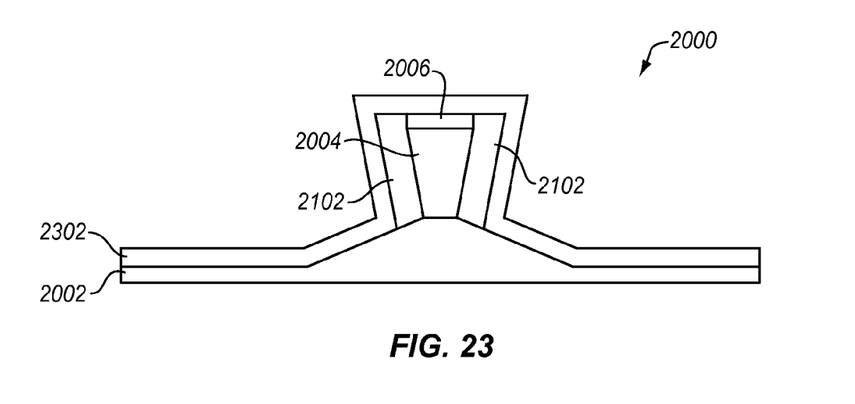

In step 1908, a layer of non-magnetic material 2302 (see FIG. 23) may be deposited, such as an Rh layer, which acts as a seed layer for electroplating the side shields as well as a stop layer during a subsequent CMP process. Multiple layers may form non-magnetic material 2102, such as 5 nm of Ta, 15 nm of Rh and 5 nm of CoFe. The Ta acts as an adhesion layer, the Rh acts as an electroplating seed and a CMP stop layer, and the CoFe acts as a photo adhesion promotion layer for an electroplating process. The resulting structure of write head 2000 is illustrated in FIG. 23.

Figure 24:
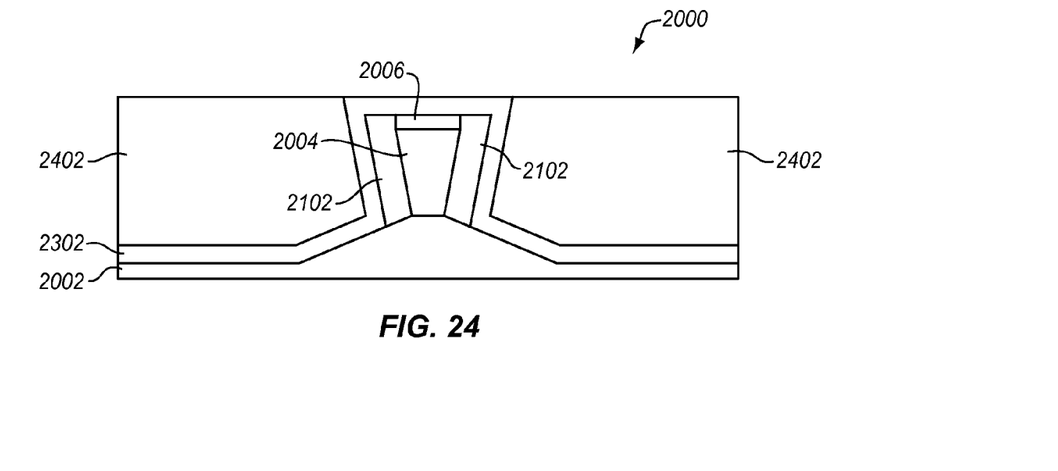

Step 1910 comprises depositing side shield material 2402 (see FIG. 24). Side shield material 2402 may be deposited using an electroplating process with non-magnetic layer 2302 (e.g., an electroplating seed layer). CMP is performed on side shield material 2402 down to non-magnetic layer 2302 (e.g., the CMP stop layer) to planarize side shield material 2402 and form side shields 2402. Non-magnetic material 2302 may act as both an electroplating seed layer and a CMP stop layer for the CMP process. For electroplating seed layer purposes, non-magnetic material 2302 may be Rh, Ru, or Au. For CMP stop layer purposes, Rh provides better properties than Ru, and Ru provides better properties than Au. Side shields 2402 are separated from write pole 2004 by a side gap defined by non-magnetic material 2102 and non-magnetic material 2302. The side gap may be between about 20 nm and about 200 nm. The resulting structure of write head 2000 is illustrated in FIG. 24.

Figure 25:
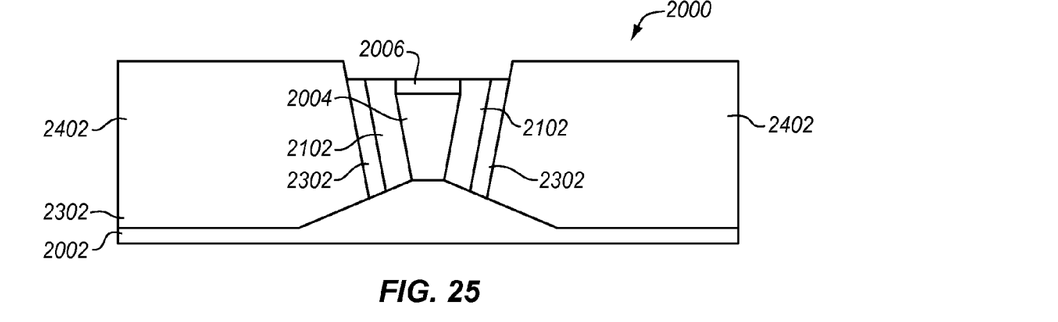
Figure 26:
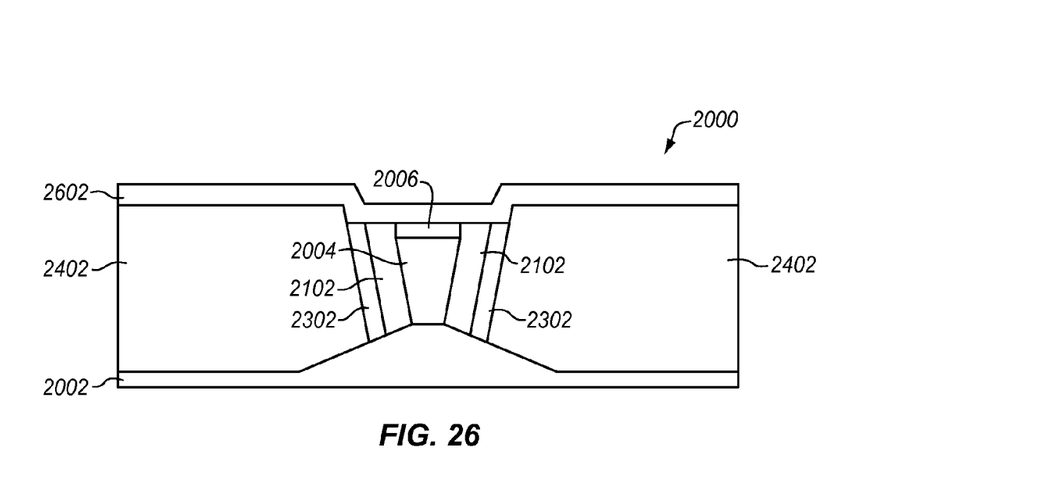

Step 1912 comprises ion milling to remove non-magnetic material 2302 above hard mask layer 2006 on write pole 2004. An Ar ion milling process controlled by SIMS endpoint detection of mask structure 2006 may be used to remove non-magnetic material 2302 above hard mask layer 2006. For example, the ion milling process may detect Ta, Ti, and Si if hard mask structure 2006 comprises a $TaO_2$ layer, a $TiO_2$ layer, or a $SiO_2$ layer on a hard mask Alumina layer. An RIE process may be performed, if necessary, to remove the $TaO_2$ layer, the $TiO_2$ layer, or the $SiO_2$ layer on a hard mask Alumina layer 2006. The ion milling process may also form a notch in write head 2000 after removing non-magnetic material 2302 above hard mask Alumina layer 2006. The resulting structure of write head 2000 is illustrated in FIG. 25.

Figure 27:
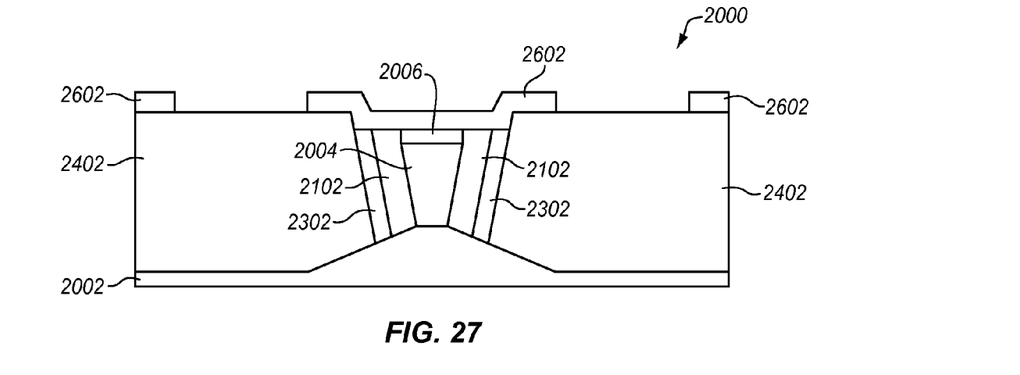

Step 1914 comprises depositing a layer of non-magnetic material 2602 (see FIG. 26), which acts as an electroplating seed layer. Step 1916 comprises milling to remove portions of non-magnetic material 2602 from each side region of write pole 2004 using a patterned photo mask to fabricate contacts in non-magnetic material 2602 on each side of write pole 2004. The contacts allow contact between side shields 2402 and a trailing shield. The resulting structure of write head 2000 is illustrated in FIG. 27.

Figure 28:
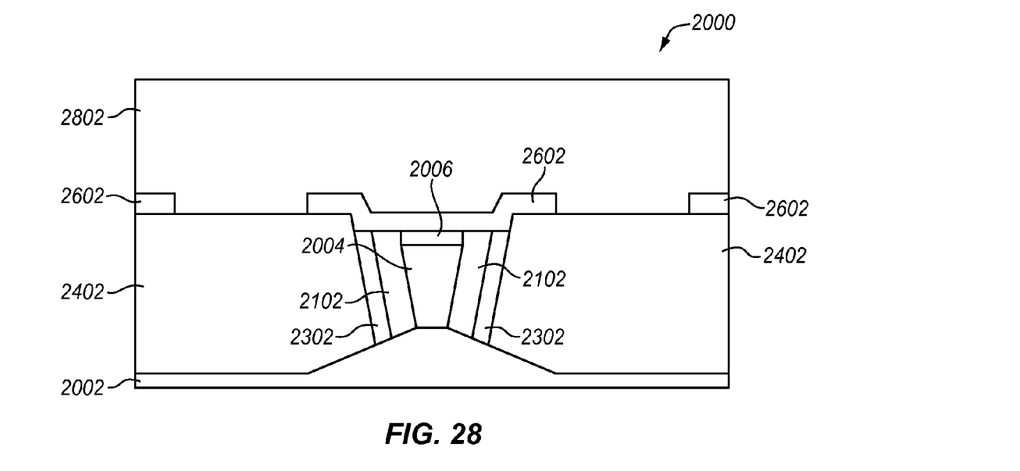

Step 1918 comprises forming a trailing shield 2802 (see FIG. 28) above non-magnetic material 2602 (i.e., above a trailing surface of write pole 2004). Trailing shield 2802 may be formed by depositing trailing shield material using an electroplating process, and performing CMP to planarize the trailing shield material to a desired height to form trailing shield 2802. Trailing shield 2802 is separated from write pole 2004 by a second gap defined by a thickness non-magnetic material 2602 and a thickness of hard mask Alumina layer 2006. The trailing gap may be between about 10 nm and about 50 nm. The resulting structure of write head 2000 is illustrated in FIG. 28. The notch which may be formed in trailing shield gap structure 2602 (see above write pole 2004 in FIG. 28) achieves better transition curvature and less flux shunting to the stitched wrap around shield for better writeability of write head 2000.

Figure 29:
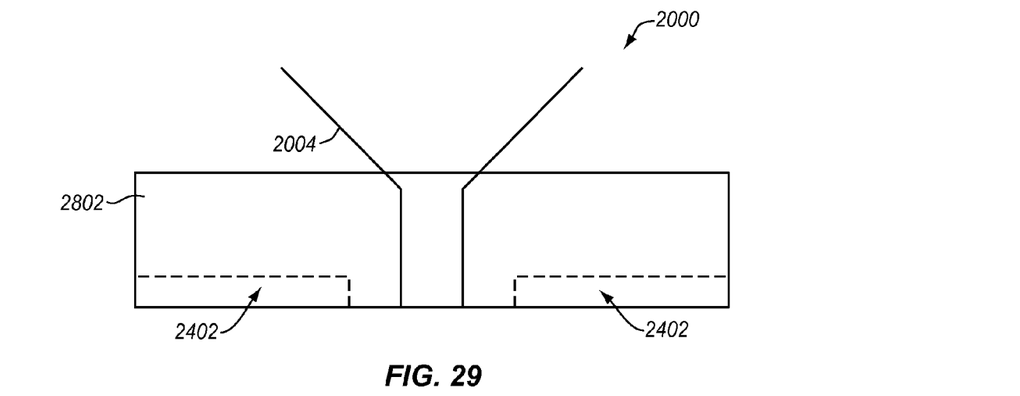

FIG. 29 illustrates a top view of write head 2000 after completion of step 1914. Trailing shield 2802 is disposed on a trailing edge of write pole 2004. Below trailing shield 2802 is a side shield 2402 on each side of write pole 2004. Side shields 2402 don't drape from trailing shield 2802 like the side shields of write head 100 in FIG. 11. Thus, the dimensions of side shields 2402 advantageously are determined independently of the dimensions of trailing shield 2802 and are more flexibly controlled, as are the dimensions of trailing shield 2802.

Although specific embodiments were described herein, the scope of the invention is not limited to those specific embodiments. The scope of the invention is defined by the following claims and any equivalents thereof.

We claim:

1. A method for forming a write head, the method comprising:
    forming a write pole of the write head;
    forming side shield gap structures on side regions of the write pole;

forming side shields on the side regions of the write pole by:
depositing a first layer of non-magnetic material;
depositing a layer of side shield material;
removing a portion of the layer of side shield material above the write pole by performing a chemical mechanical polishing (CMP) process on the layer of side shield material, wherein the first layer of non-magnetic material acts as a CMP stop layer during the CMP process; and
removing the first layer of non-magnetic material above the write pole, wherein the side shield gap structures define a first gap separating the write pole and the side shields;
forming a trailing shield gap structure above the write pole by:
depositing a second layer of non-magnetic material; and
fabricating contacts in the second layer of non-magnetic material on each side of the write pole to allow contact between the side shields and a trailing shield; and
forming the trailing shield of the write head, wherein the trailing shield gap structure defines a second gap separating the write pole and the trailing shield, and wherein the second gap is less than the first gap.

2. The method of claim 1, wherein removing the first layer of non-magnetic material above the write pole further comprises:
milling the first layer of non-magnetic material above the write pole.

3. The method of claim 1, wherein fabricating contacts in the second layer of non-magnetic material on the side regions of the write pole further comprises:
milling the second layer of non-magnetic material on the side regions of the write pole.

4. The method of claim 1, wherein a thickness of the first gap is between about 20 nm and about 200 nm.

5. The method of claim 1, wherein a thickness the second gap is between about 10 nm and about 50 nm.

6. The method of claim 1, wherein forming the trailing shield further comprises:
depositing a layer of trailing shield material above the second layer of non-magnetic material; and
performing a CMP process on the trailing shield material to planarize the trailing shield material.

* * * * *

UNITED STATES PATENT AND TRADEMARK OFFICE
CERTIFICATE OF CORRECTION

Page 1 of 2

| | |
|---|---|
| PATENT NO. | : 8,051,552 B2 |
| APPLICATION NO. | : 11/747704 |
| DATED | : November 8, 2011 |
| INVENTOR(S) | : Jiang et al. |

It is certified that error appears in the above-identified patent and that said Letters Patent is hereby corrected as shown below:

Delete Drawing sheet 1 of 12 and insert Drawing Sheet 1 of 12 as attached.

In FIG. 1, the text "PRIOR ART" is missing.

Signed and Sealed this
Seventeenth Day of January, 2012

David J. Kappos
*Director of the United States Patent and Trademark Office*

FIG. 1
PRIOR ART